United States Patent
Koehler et al.

(10) Patent No.: US 9,613,441 B2
(45) Date of Patent: Apr. 4, 2017

(54) JOINT RECONSTRUCTION OF ELECTRON DENSITY IMAGES

(71) Applicant: KONINKLIJKE PHILIPS N.V., Eindhoven (NL)

(72) Inventors: Thomas Koehler, Norderstedt (DE); Bernhard Johannes Brendel, Norderstedt (DE); Ewald Roessl, Henstedt-Ulzburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/916,609

(22) PCT Filed: Aug. 29, 2014

(86) PCT No.: PCT/EP2014/068329
§ 371 (c)(1),
(2) Date: Mar. 4, 2016

(87) PCT Pub. No.: WO2015/043870
PCT Pub. Date: Apr. 2, 2015

(65) Prior Publication Data
US 2016/0217596 A1 Jul. 28, 2016

(30) Foreign Application Priority Data
Sep. 26, 2013 (EP) .................................... 13186108

(51) Int. Cl.
*G06T 11/00* (2006.01)
*G06T 7/00* (2017.01)

(52) U.S. Cl.
CPC .......... *G06T 11/006* (2013.01); *G06T 7/0012* (2013.01); *G06T 2207/10081* (2013.01); *G06T 2211/408* (2013.01); *G06T 2211/424* (2013.01)

(58) Field of Classification Search
CPC ....... A61B 6/484; A61B 6/482; A61B 6/5205; A61B 6/4241; A61B 6/5235;
(Continued)

(56) References Cited

U.S. PATENT DOCUMENTS 8,515,147 B2 8/2013 Baeumer
2005/0226376 A1 10/2005 Yun
(Continued)

FOREIGN PATENT DOCUMENTS

DE WO 2011145040 A1 * 11/2011 ............... G06T 5/50
WO 2006123581 11/2006
WO 2013/027138 2/2013

OTHER PUBLICATIONS

Huh, Wonseok, and Jeffrey A. Fessler. "Iterative image reconstruction for dual-energy x-ray CT using regularized material sinogram estimates." In 2011 IEEE International Symposium on Biomedical Imaging: From Nano to Macro, pp. 1512-1515. IEEE, 2011.*
(Continued)

*Primary Examiner* — Sumati Lefkowitz
*Assistant Examiner* — Carol Wang (57) ABSTRACT

A method and a related system (IMA) for reconstructing an image of an electron density in a subject PAT. An x-ray radiation imager is used to expose the subject PAT to radiation to receive projection data. The reconstruction method combines projection data from two channels, namely Compton scatter based attenuation data $p_C$ and phase shift data $p_{d\phi}$.

20 Claims, 3 Drawing Sheets (58) Field of Classification Search
CPC ... A61B 6/5282; A61B 5/0073; G06T 7/0012; G06T 2211/424; G06T 2211/408; G06T 2207/10081; G06T 2207/10116; G06T 11/003
See application file for complete search history.

(56) References Cited

U.S. PATENT DOCUMENTS

| | | |
|---|---|---|
| 2011/0103669 A1 | 5/2011 | Michel |
| 2012/0265050 A1 | 10/2012 | Wang |
| 2013/0032715 A1* | 2/2013 | Zhu ............... G21K 1/02 250/309 |

OTHER PUBLICATIONS

Wu, Xizeng, and Aimin Yan. "Phase retrieval from one single phase contrast x-ray image." Optics express 17, No. 13 (2009): 11187-11196.*

Weitkamp, et al., "X-ray phase imaging with a grating interferomter", Optics Express, vol. 13, No. 16, pp. 6296-6304, 2005.

Momose, et al., "Four-Dimensional X-ray Phase tomography with Talbot Interferometry and White Synchrontron Radiation: Dynamic Observation of a Living Worm", vol. 19, No. 9, Optics Experss, Apr. 2011.

Alvarez, "Energy-selective reconstructions in X-ray computerized Tomography", Phys. Med. Biol., 1976, vol. 21, No. 5, pp. 733.

Zanette, "Interlaced phase stepping in phase-contrast x-ray tomography", Applied Physics Letters, 094101, 2011.

Zanette, "Timodal low-dose X-ray tomography" PNAS, vol. 109, No. 26, pp. 10199-10204, Jun. 26, 2012.

Kohler, "Iterative Reconstruction for Differential Phase Contrast Imaging using spherically symmetric basis functions", Med Phys 38(8), 2011, pp. 4542.

Gauntt, et al., "X-ray tube potential, filtration and detector considerations in dual energy chest radiography", Med Phys 21(2), Feb. 1994.

Zihua Qi, et al., "Quantitative imaging of electron density and effective atomic number using phase contrast CT; Duantitative imaging of electron density and effective atomic number", Physics in Medicine and Biology, vo. 55, No. 9, May 7, 2010.

Zou, et al., "Analysis of fast kV-switching in dual energy CT using a pre-reconstruction decomposition technique", Proceedings of SPIE, vol. 6913, Mar. 18, 2008.

* cited by examiner

JOINT RECONSTRUCTION OF ELECTRON DENSITY IMAGES

CROSS REFERENCE TO RELATED APPLICATIONS

This application is the U.S. National Phase application under 35 U.S.C. §371 of International Application No. PCT/EP2014/068329, filed Aug. 29, 2014, published as WO 2015/043870 on Apr. 2, 2015, which claims the benefit of European Patent Application Number 13186108.0 filed Sep. 26, 2013. These applications are hereby incorporated by reference herein.

FIELD OF THE INVENTION

The invention relates to a method for generating an image, to an image processing system, to a computer program element, and to a computer readable medium.

BACKGROUND OF THE INVENTION

Conventional x-ray imaging focuses on attenuation as a physical quantity to provide contrast between various types of human tissue. More recently, other imaging techniques like dual-energy imaging or phase contrast imaging provide information about different physical quantities like the electron density, refractive index decrement, or scattering cross sections of the imaged tissues. It appears that image contrast (that is, the relative differences between image elements) can be more pronounced in either of the attenuation based imaging or refractive index based imaging and it appears that no general statement can be made as to which one of the two imaging techniques is the better one.

SUMMARY OF THE INVENTION

There may therefore be a need for a method and related apparatus or system for image generation to robustly improve image quality in a broad range of applications.

The object of the present invention is solved by the subject matter of the independent claims where further embodiments are incorporated in the dependent claims. It should be noted that the following described aspect of the invention equally apply to the image processing system, to the computer program element and to the computer readable medium.

According to a first aspect of the invention there is provided a method for generating an image of electron density distribution in an object, comprising the following steps of:

receiving:

i) for at least one energy value, a phase-contrast sinogram, $p_{d\phi}$, as detected by a radiation sensitive detector, with $p_{d\phi}$ relating to phase shift gradients of phase shifts experienced by radiation after the radiation's passage through the object; and ii) a Compton attenuation sinogram, $p_C$, as detected by the, or a different, radiation sensitive detector, with $p_C$ recording essentially the Compton scatter contribution to an overall attenuation experienced by the radiation in said passage through the object;

based on both of the two sinograms $p_{d\phi}$ and $p_C$, jointly reconstructing for a cross section image of the electron density.

In one embodiment joint reconstruction is based on a (statistical) iterative reconstruction algorithm, that is, on one that proceeds iteratively from an initial estimate for the electron density image through a series of subsequent "updated" estimates for the electron density image and it is proposed herein to feed the Compton sinogram $p_C$ and the differential phase contrast sinogram $p_{d\phi}$, into said (single or common) iterative reconstruction algorithm. This allows combining projective information about the electron density from two different modalities or "channels" (spectral or dual energy on the one hand (which is used to derive the Compton sinogram) and phase contrast on the other hand which is used to derive the phase-contrast sinogram) to so better manage adverse noise behavior that may otherwise corrupt image quality.

According to one embodiment, "jointly reconstructing" includes in particular that, in each iteration step (or at least in a plurality of iteration steps), estimates for both sinograms ($p_C$ and $p_{d\phi}$) are generated and compared with the actually measured sinograms $p_C$ and $p_{d\phi}$. Each update for the electron density image estimate is derived from a "misfit" in respect of both of the estimated sinograms for $p_C$ and $p_{d\phi}$. In yet other words, both of the sinograms $p_C$ and $p_{d\phi}$ are used as "reference data" to gauge whether the iteration converges to an estimate for the electron density that, when forward-projected, approximates to a sufficient degree the actually measured sinograms $p_C$ and $p_{d\phi}$.

Because in the proposed method data from the two modalities are combined into a single reconstruction algorithm, a useful balance may be struck to so better handle or negotiate two opposing noise effects: (i) dominant image noise in higher spatial frequencies in dual-energy material decomposition and (ii) dominant image noise in lower spatial frequencies in the differential phase contrast imaging channel that is caused by the differential nature of the phase sinogram $p_{d\phi}$. Also, in the proposed method, because of incorporating data from both channels ($p_C$ and $p_{d\phi}$) into the (joint) iterative reconstruction, is rather robust in respect of missing data (for reasons of phase wrapping, loss of coherence, etc.) because the other channel may still hold enough information to achieve a reconstruction of satisfactory fidelity. It is not necessary herein that both sinograms $p_C$ and $p_{d\phi}$ are acquired by the same detector and technologies are envisaged herein where each channel is acquired by a dedicated detector module, the respective exposures of which are controlled for instance by focal spot movement of the x-ray source used.

According to one embodiment, the iterations in the joint reconstruction are driven by a cost function that includes a noise term that models noise as recorded in the two sinograms. The individual noise level and/or behavior in both sinograms is taken into account correctly. There is no modeling of noise) in image domain required since the noise estimates for the measured data are taken into account instead which is easier to implement because the noise is known to be white in this domain. Put differently, the reconstruction is essentially a transformation from projection space (where the sinograms are defined) into image space (that is, the 3D space defined by points in the scanner's bore where the object resides during imaging and where the to-be-reconstructed electron density image is to be defined). Considering the reconstruction algorithm as such a transformation, the proposed method can then be said to use the noise term in the cost function to models or capture noise behavior already in projection space and not in image space.

The cost function is configured to take into account both signal channels, $p_C$ and $p_{d\phi}$. In other words, the cost function is a common cost function for both channels. This is achieved for instance by using in the cost function and for the reconstruction a ("combo"-) system matrix (that is, a representation of the forward projection operator) with a dedicated component for the Compton channel, which is a conventional discrete implementation of line integrals, and a further dedicated component for the differential phase contrast channel, which is a discrete implementation of differential line integrals. The noise term of the cost function is used to weight deviations between the actually measured sinograms and projections of the electron density estimates generated during the course of the iterative reconstruction.

In one embodiment, the noise model in the noise term is parameterized by a covariance matrix. In one exemplary embodiment, the covariance matrix is of diagonal form. In this embodiment, the covariance matrix neglects any possible covariance between the two channels. This is a valid to a good approximation, but the proposed invention can also be implemented with a covariance matrix that has at least one non-zero off diagonal element or in particular is a full covariance matrix.

According to one embodiment, the reconstruction incorporates the conjugate gradient method to solve for the electron density image in particular to minimize said cost function.

According to one embodiment, the $p_C$ and/or $p_{d\phi}$ sinograms are detected using a multi-energy scanner, in particular a dual energy scanner or a scanner with multi layer, in particular dual layer detector, or a spectral imaging scanner having a photon counting detector.

According to one embodiment, the scanner includes differential phase contrast imaging equipment for the acquisition of the phase-contrast sinogram $p_{d\phi}$. In one embodiment, the equipment comprises an interferometer including a plurality of grating structures.

In one embodiment the cost function is based on a maximum-likelihood approach and an update function for the iterative reconstruction is derived by numerical minimization algorithm applied to the cost function.

The object may be a human or animal patient or a relevant part thereof (Region of interest). The method and related system may also be used in non-medical contexts where the object is item of baggage such as in security screenings or an organic or inorganic sample in non-destructive material testing.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
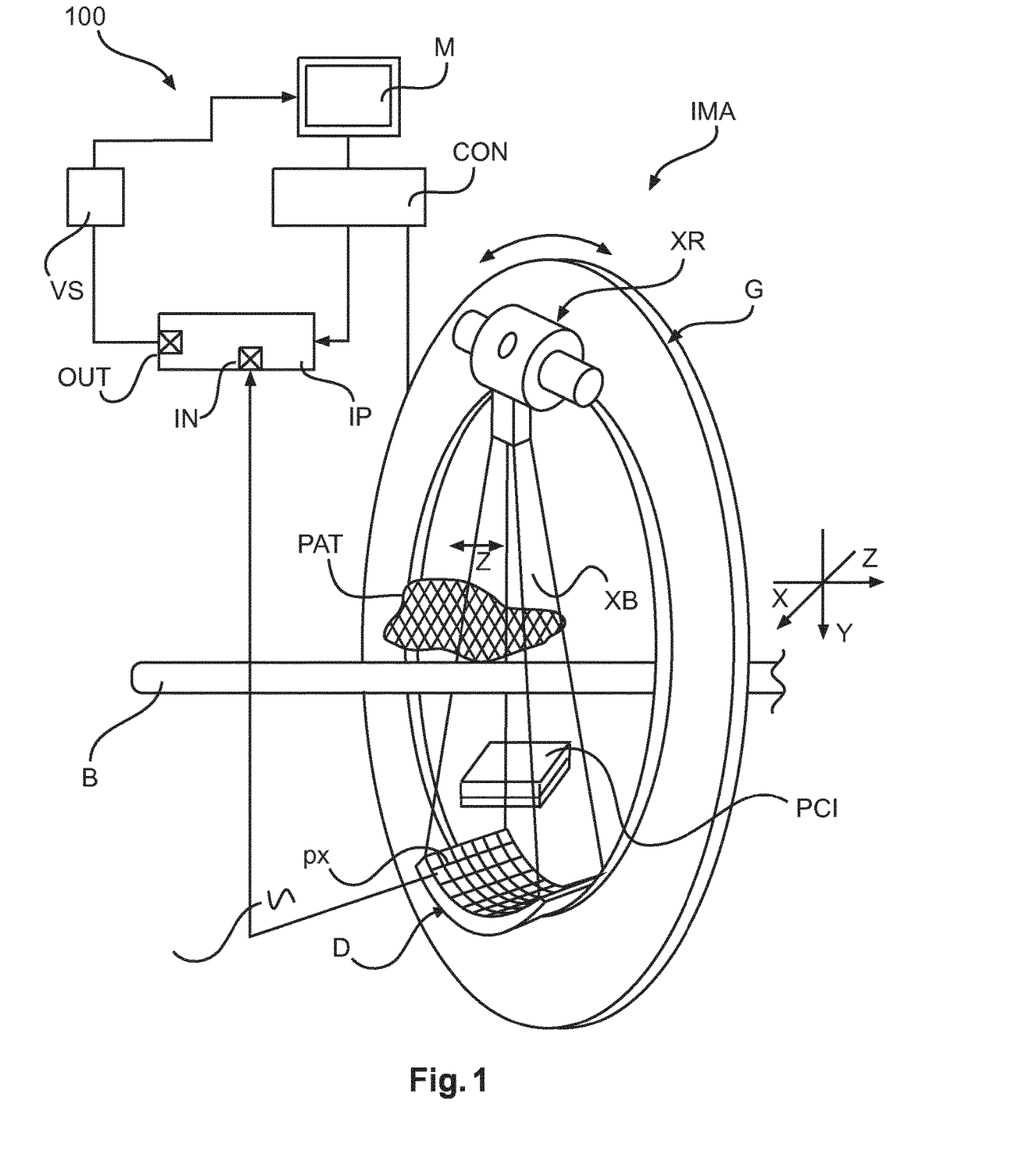
FIG. 1 shows an imaging arrangement.

With reference to FIG. 1, there is shown an imaging system according to one embodiment. Broadly, said imaging arrangement includes an X-ray based CT scanner IMA and a workstation or operating console CON for controlling operation of said scanner IMA.

A general purpose computing system may serve as the operator console CON, and includes an output device such as a display M and an input device such as a keyboard, mouse, and/or the like. Software resident on the console CON allows the operator to control the operation of the system IMA, for example, allowing the operator to select imaging parameters directly or indirectly through selecting a pre-generated imaging protocol. Display unit (such as a monitor/screen) M is communicatively coupled to console CON to aid inputting control information or to view operational sates of the scanner or to view images supplied by the scanner or of images obtained by image processing the so supplied images. There is also an image processing module IP that is in one embodiment communicatively coupled to console CON to effect image processing. Broadly, image processor IP includes input IN and output OUT interfaces and affords image reconstruction functionality. Operation of image processing module IP will be explained in more detail further below at FIG. 3.

Image rendering of the reconstructed images for display on screen M is by a visualizer VS that is configured to receive image data and visualization information to drive a video card of console CON to so effect display on screen M. Visualization information may include a color or gray palette on which the image values are mapped by a mapper to effect display in a desired color- or gray coding in a desired range.

The scanner IMA includes a stationary gantry and a rotating gantry G, which is rotatably supported by the stationary gantry. The rotating gantry 104 rotates around an examination region, about a longitudinal or z-axis. The examination region is formed as an opening or bore in the rotating gantry G.

A subject support B, such as a couch, supports a subject PAT or object in the examination region and can be used to position the subject or object with respect to x, y, and/or z axes before, during and/or after scanning.

A radiation source XR, such as an X-ray tube ("tube"), is supported by the rotating gantry 104 and rotates with the rotating gantry G about the examination region, and emits radiation, via a focal spot, that traverses the examination region. In one embodiment, that source XR can operate at at least two different voltages to so afford dual-energy mode functionality.

The radiation beam is centered about an iso-center of the bore and defines a generally circular shaped field of view FoV (of the scanner) to reconstruct for a transverse reconstruction plane, which is generally perpendicular to a center ray of the beam and which extends through the iso-center.

A radiation sensitive detector array D (in a suitable housing) is located opposite the radiation source XR, across the examination region. The detector array D includes one or more rows of detector pixels px that detect radiation traversing the examination region and generate an electrical current or voltage signal indicative of the detected radiation. Rotation of rotatable gantry (and thus of at least the X-ray source's focal spot in a fourth generation scanner it is only the tube that rotates in the gantry, with the detector array fixedly arranged to line all of the inside of the gantry to that at least a part of the detector can receive radiation for any rotation angle), is effected by one or more controllers and/or one or more drive systems (e.g., a motor, a coupling, etc.).

During an imaging run when the scanner is in use, focal spot rotates over a predetermined angular range on a path (in general an arc or a full circular rotation) around bore B and hence subject or object PAT therein at a given angular frequency during a scan of the subject or object. For each rotation angle $\phi$, the detector detects the radiation emitted by the focal spot after passage through the subject or object at said angle. The radiation experiences attenuation and a certain phase shift of the radiation when considered as a wave rather than a ray during passage through the subject or object. The attenuation is in general proportional to the local densities of the subject or object and the phase shift relates to the local refractive index of the material. Each detector pixel (opposite focal spot) receives a certain amount of photonic energy and responds by issuing a corresponding electric signal as briefly mentioned above. The collection of said signals is then translated by a data acquisition system DAS (not shown) into a respective digital value. Said value encodes information on the amount of attenuation and the phase shift experienced by the x-ray beam, and said information can be extracted by using an interferometric set-up as will be explained in more detail below. Both, attenuation and phase shift can be described by the local complex refractive index n(x,y,z) (a complex number that is) of the radiation flooded tissue PAT with the real part of the complex refractive index describing the phase shift and the imaginary part the attenuation. The collection of the digital values are then consolidated into an array of digital values forming a 1D or 2D X-ray projection image of image raw data for a given acquisition time and projection angle θ. The detector thereby outputs a collection of raw projection images, one or more for each rotation angle θ, to so define a raw image data sinogram, that is, a data structure in which to each projection direction/rotation angle θ there is associated raw image data as detected by the detector D at the respective angle θ). In one embodiment, the detector is of the photon counting type. In an alternative embodiment the detector is of the energy integrating type.

When the detector D is of the photon counting type, the imager's DAS includes energy resolving circuitry which may comprise a pulse shaper configured to processes the electrical signal output by the detector array D and to generate a pulse such as voltage or other pulse indicative of the energy of the detected photon. An energy discriminator discriminates the energy or the pulse (which is a measure for the energy of the detected x-ray photon). In one embodiment, the energy discriminator includes at least one comparator, which is configured to compare the amplitude of the pulse with at least one energy threshold that corresponds to an energy of interest. The comparator produces an output signal indicative of whether the energy of a detected photon is above or below the threshold. A counter increments a count value for each threshold. For instance, when the output of the comparator for a particular threshold indicates that the amplitude of the pulse exceeds the corresponding threshold, the count value for that threshold is incremented. An energy binner assigns the counted pulses to energy bins, which correspond to different energy ranges. For example, a bin may be defined for the energy range between two thresholds, where a photon resulting in a count for the lower threshold but not for higher threshold would be assigned to that bin. In other words, when a photon counting detector is used, there is a collection of sinograms picked up by the DAS, one sinogram for each energy bin or level.

Where the imaging system IMA includes (one or more rows) of merely energy integrating detector pixels px, the energy resolving circuitry can be omitted and energy information is obtained by acquiring data using different x-ray input spectra. In a preferred embodiments however, the imager has a detector of the photon counting type or of the dual layer type or has a detector according to any other suitable technology that affords energy resolving capabilities.

As further shown in FIG. 1, the imaging scanner CT includes phase contrast imaging equipment PCI which allows extracting phase shift gradients from the recorded projection images. This is because, as briefly mentioned, on top of the attenuation suffered by the X-ray in its passage through matter PAT, there is also phase shift φ caused by intervening matter PAT.

The basic components of the phase contrast imaging equipment PCI, essentially a grating based interferometer, are briefly described with reference to FIG. 2.

Figure 2:
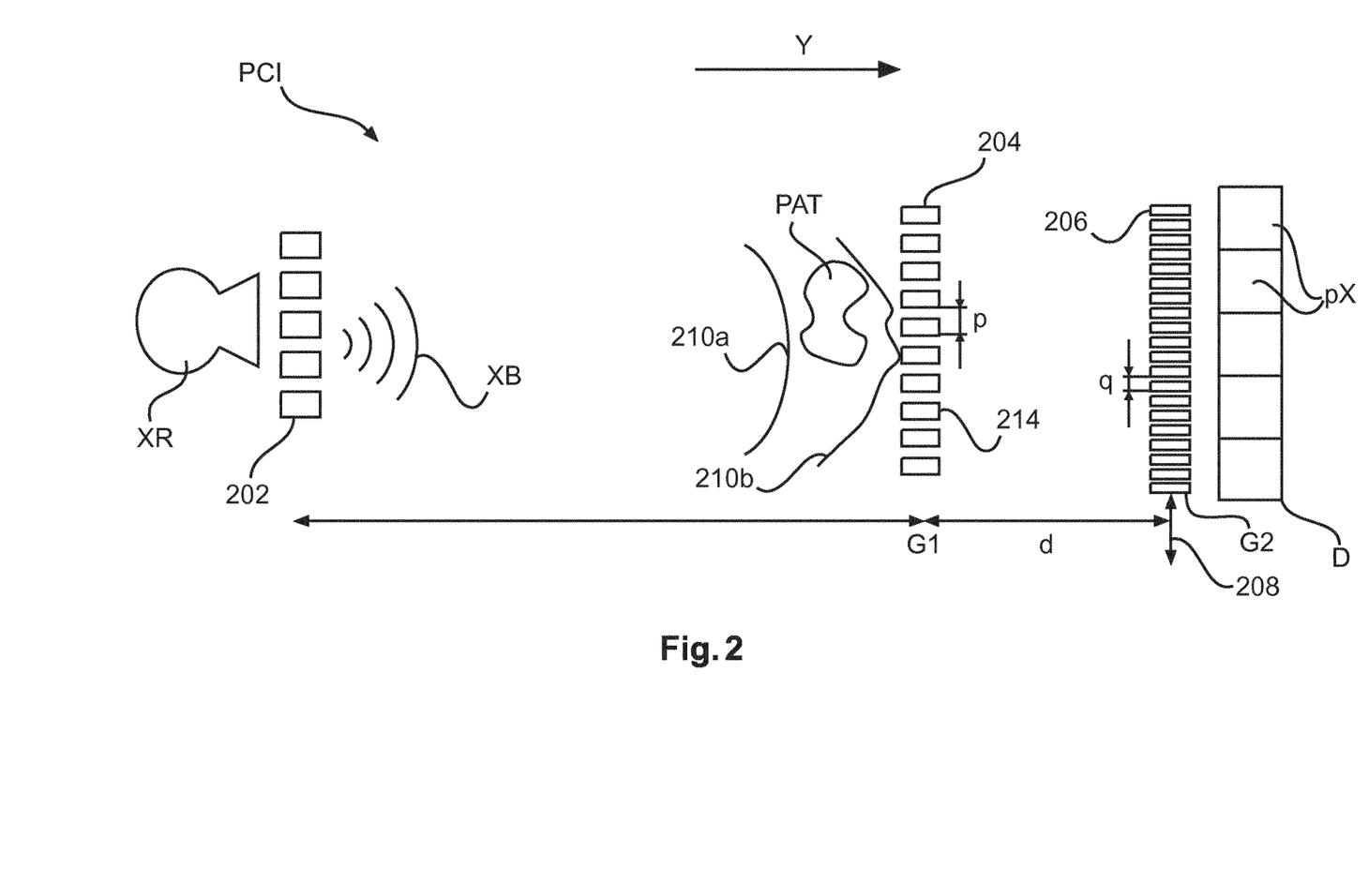
FIG. 2 shows phase contrast imaging equipment as used in the arrangement according to FIG. 1.

In FIG. 2, X-ray source XR is depicted having a source grating element 202 arranged adjacently. X-ray radiation 114 penetrating source grating element 202 may be considered to be at least partially spatially coherent. X-ray radiation XR comprises individual wave fronts of which wave front 210a is depicted as a wave front before penetration of object 108 while wave front 210b is depicted after penetration of object PAT, having an illustrated phase-shift.

Arranged after object PAT and spaced apart from both the detector element 104 and an analyzer grating $G_2$ 206 by distance d, is phase grating 204 having a pitch p. Detector D, with its individual detector pixel elements 116, subsequently detect an interference pattern of X-ray radiation XR, imposed by phase grating $G_1$ 204 and analyzer grating $G_2$ 206.

Actuator element 208 is schematically illustrated being adapted to laterally displace analyzer grating $G_2$ 206 (having pitch q) relative to X-ray tube XR with source grating 202, phase grating $G_1$ 204 and X-ray detector D. However, actuator element 208 may be arranged at any of the grating elements 202, 204, 206 for displacement x. Said actuator is used to effect what is known as "phase stepping". In phase stepping, one of the source grating, employed for generating the at least partly spatial coherent X-ray radiation, the phase grating, and the analyzer grating is displaced laterally with respect to the other gratings and the X-ray detector element by a fraction of its respective grating pitch, e.g., a fourth, sixth, or eighth of the grating pitch of the respective grating element constituting a phase stepping state. Image acquisition and lateral displacement is repeated, e.g., four, six, or eight times, for acquiring a plurality of phase contrast projections, constituting together a phase stepping series that causes a signal of varying intensity I which can be analyzed to recover attenuation and phase shift.

The phase-shift of the X-ray beam XB's wave fronts may be considered to be directly related to the integral of the electron density along the path of X-ray radiation. Grating-based differential phase-contrast imaging may allow employing a relatively broad-banded X-ray source, e.g., with ΔE/E~10%. In other words, polychromatic X-ray radiation rather than monochromatic X-ray radiation having substantially only a single wavelength may be employed for phase-contrast imaging.

It is understood that FIG. 1 shows the arrangement of PCI in a highly schematic way as interposed between x-ray source and detector D. In one embodiment, the PCI gratings G1, G2 are integrated in detector D's housing, in particular are mounted in one embodiment on the detector D, and the source grating element 202 is integrated in the egress portion of x-ray source XR.

An interesting observation is that both, i) energy resolving imaging such as dual-energy imaging (or more general, spectral imaging techniques based on photon counting) and ii) phase contrast imaging, provide each information about the electron density of the sample PAT. In dual-energy or photon counting imaging, decomposition of the attenuation into photo-electric effect and Compton-effect provides in effect a map of the electron density of sample PAT. Likewise, in phase contrast imaging, the refractive index decrement caused by the sample PAT is strictly proportional to the electron density in the x-ray wavelength regime, and can be obtained through phase stepping in the gratings-based phase contrast imaging setup as explained above in relation to FIG. 2. In other words, Compton effect based attenuation and the phase shift recordings in phase contrast imaging furnish two separate channels of information for the distribution of the electron density and it is proposed herein an image processor IP that harnesses this apparent "redundancy" to combine the information from both channels or modalities in a manner so as to address a challenge posed by adverse noise behavior which is twofold. First, image noise has been observed to increase in an at least dual-energy material decomposition which may explain the relatively low uptake of this method in clinical practice. Second, when applying computed tomography reconstruction algorithms to a differential phase contrast imaging sinogram, noise power has been observed to increase towards lower frequencies contrary to the case of attenuation imaging where noise increases in higher frequencies.

The image processor IP as proposed herein address this noise behavior challenge by combining the information about the electron density from the two modalities (spectral/dual-energy or otherwise energy resolving and phase contrast) in a "jointwise" reconstruction algorithm for both modalities as will now be explained in more detail. The reconstruction algorithm as proposed herein allows to reconstruct, based on the projective imagery furnished by the Compton attenuation sinogram and one or more phase shift sinograms, to generate cross sectional images ("slice (image)") of the electron density in the sample PAT for each axial position z. The collection of trans-axial slice images can then be combined by suitable renderer modules into volumetric image data indicative of the density of the subject PAT.

In the following it is explained in more detail an approach for modeling physical interactions that give rise to the recorded imagery at the detector D and that underlie the proposed algorithm run by image processer IP.

Initially, for each projection angle θ, during phase stepping, the radiation signal intensity I is picked up by a detector pixel px and said signal oscillates at a said detector pixel/channel px with the phase stepping x scan in approximation as follows:

$$I(x) = A\left(1 + V\cos\left(2\pi\frac{x}{q} + \varphi\right)\right) \quad (1)$$

where A is related to the overall linear attenuation of the ray, φ is related to the local phase shift gradient of the wave front 201b, V ("visibility") is the small angle scattering, q is the grating pitch, and x is the relative displacement of the grids G1 and G2 during phase stepping.

The oscillating signal I is captured as a curve by suitable sample-and-hold-circuitry and the values A, V, φ can be extracted from said curve in a "phase retrieval step" by running a fast fast-Fourier transform (FFT) on the captured signal I curve. The Fourier decomposition then yields A as the DC component, with the amplitude of the frequency component v=1/q being a measure for the visibility V and φ is the phase of the frequency component v=1/q.

It is understood herein, that the approximation as per (1) is in general different for each pixel px as each pixel px will in general see a different fluctuation of intensity for each x so the values A, V, φ will need to be fitted separately for each pixel px. The projection of the phase gradient ∂Φ of the wave front is related to and can be recovered from the measure phase value φ of the intensity curve I through the relation $$\varphi = \lambda \frac{d}{q} \partial \Phi / \partial x,$$

with x indicating the phase stepping direction and d being the distance between gratings $G_1$ and $G_2$, and λ the wave length of the design energy $E_d$ which approximates the Energy spectrum of the in general polychromatic radiation. See for instance equation (1) in the paper of T Weitkamp et al in "Optics Express", vol 13, No 16, pp 6296-6304 (2005).

In another embodiment, the phase retrieval is not done by the phase-stepping approach where one of the gratings is moved, but it is done by the Fourier Method. This Fourier method is described in more detail by A Momose et al in "Four-dimensional X-ray phase tomography with Talbot interferometry and white synchrotron radiation:dynamic observation of a living worm", Vol. 19, No. 9, OPTICS EXPRESS, pp 8423, April 2011.

A mathematical expression of the physical model that relates the contributions of the photo-electric effect $p_p$ and Compton scattering $p_C$ to the linear attenuation coefficient and the phase $\phi(E_d)$ from the intensity measurements at different grid positions x is:

$$I(x) = \int dE I_0(E) e^{-\int \mu(E,l) dl} + \int dE V(E) I_0(E) e^{-\int \mu(E,l) dl} \quad (2)$$

with $\cos\left(2\pi\frac{x}{p} + \varphi(E_d)\frac{E_d}{E}\right)$ $$\int \mu(E, l) dl = p_P (E/E_d)^{-3} + p_C f_{KN}(E) \quad (3)$$

wherein:
E is the energy range or value;
l is the in-tissue path length through object PAT;
I is the intensity recorded at grid position x in the imaging run, whereas $I_0$ is the "reference" intensity recorded at the pixel in an "air" or blank scan;
V is the visibility, that is, the modulation depth of the interference pattern.
$E_d$ is the design (or more generally speaking a reference) energy. This is the energy at which the interferometer of FIG. 2 responds with the best visibility V. In other words, the design energy is the energy where the observed modulation depth of the interference pattern is at its maximum. This modulation depth is probed during the blank scan and is quantified by the fitted value V to the data acquired during the blank scan;
x=grid position;
$p_p$, $p_C$=the respective contributions of the photoelectric effect and Compton scattering to the attenuation of the beam;
φ=phase shift of an interference pattern caused by object PAT and as recorded at the detector via the interferometric arrangement as per FIG. 2 the phase shift gradient ΔΦ of the wave is recoverable therefrom as mentioned above in relation to the Weitkamp paper;
$f_{KN}$=the Klein-Nishina formula describing the energy dependence of the Compton scattering cross-section in the energy range at hand.

Model equations (2), (3), can be understood as a rewrite of equation (1) where now the intensities I(.) seen at the respective grid position x for each energy are integrated over the energy spectrum of the attenuated X-ray beam as registered at the detector D.

Equation (3) defines essentially a spectral decomposition of the overall linear attenuation into separate photoelectric and Compton scatter contributions. It can also be seen, that image acquisitions by imager IMA at at least two energy levels would allow solving for the respective attenuation contributions. This is the "dual-energy approach" and is described by Robert Alvarez in "Energy-selective reconstructions in X-ray computerized Tomography", Phys. Med. Biol., 1976, Vol 21, No 5, pp 733.

Figure 3:
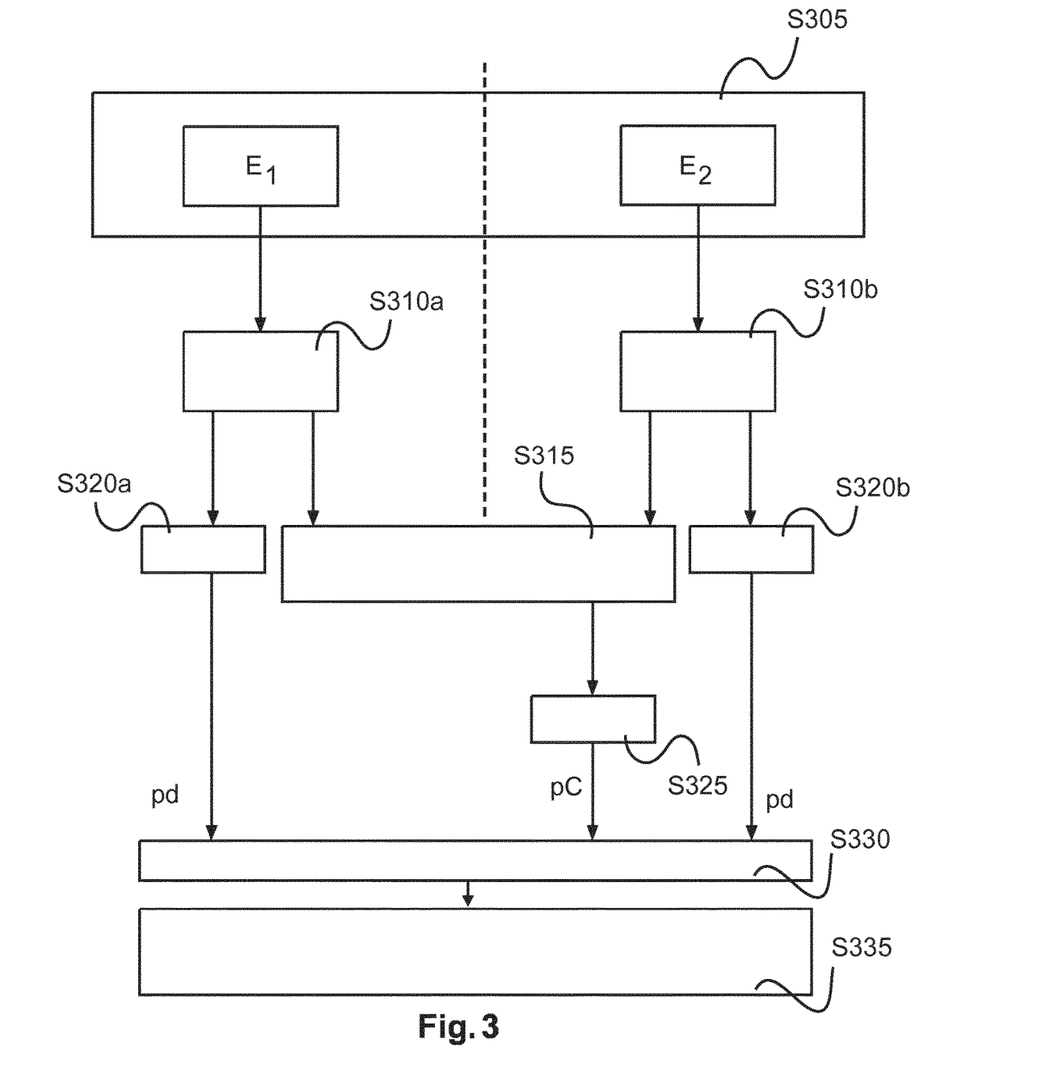
FIG. 3 shows a flow chart for a method of generating an image.

In the following, with reference to the flow chart in FIG. 3, method steps are described that are implemented by image processer IP. The method allows reconstructing a cross sectional electron density image from the projection data, namely the Compton attenuation sinogram $p_C$ and the phase shift sinogram $p_{d\phi}$.

At step S305, imager IMA operates to acquire, for at least two energy levels E1, E2, raw image data of object PAT (or raw image data of at least a part of object PAT) by using the imager IMA's PCI equipment to perform the phase stepping as outlined earlier above in relation to FIG. 2.

The raw image data represents the overall change, in particular the overall refraction (that is, phase shift of the radiation wave front and attenuation by scatter and absorption) which the radiation wave 210b experienced in its passage through subject PAT tissue during the acquisition. The respective spectrally distinct images for each energy level E1, E2 are acquired in one embodiment by operating the imager's tube XR in dual energy mode, that is, the raw image data is acquired at different voltages (kV). In other embodiments, other spectral acquisition modes are also envisaged instead of dual energy, for instance a dual layer detector is used or the detector operates in photon counting mode having bins corresponding to the at least two energy levels E1, E2.

At step 310a,b a phase retrieval is performed on the respective raw image data for each energy level E1, E2 to obtain:

in the form of an attenuation sinogram, the projections of the attenuation and the projections of the gradient phase shift in form of a respective differential phase sinogram $p_{d\phi}$. The differential phase sinograms $p_{d\phi}$ encode at each entry the respective projection (that is, the line integral along the respective ray) the phase gradient, that is, the rate of change of the phase which the radiation wave front experienced in its passage through the subject PAT tissue.

The phase retrieval may include phase stepping not only separately for each projection direction (as is done in classical phase stepping described by Weitkamp) but also across a plurality of entries for a plurality of projection angles. In other words, phase stepping is "interlaced", that is, is not confined to construct the intensity signal only row or column-wise but may be constructed across the projection angle-versus-grating position plane as described for instance by I Zanette in "Interlaced phase stepping in phase-contrast x-ray tomography", APPLIED PHYSICS LETTERS 98, 094101, (2011). An extension of the interleave method is the "sliding windows" method which is also envisaged herein and is described by I Zanette in "Trimodal low-dose X-ray tomography in PNAS, vol 19, No 26, pp 10199-10204, 26 Jun. 2012. In the sliding windows method there is not only phase stepping across different projection angles but certain points in the projection angle-versus-grating position plane are revisited to improve computational efficiency.

The 2 or more phase contrast sinograms (that is, one phase contrast sinogram per energy channel E1, E2) can be collapsed into one single "spectral" sinogram (the respective energy dependent entries are simply adjoined one to the other in sequence to so enlarge the sinogram vector) but this may not be so necessarily and in some embodiments a single sinogram is selected instead for a certain energy and it is this selected sinogram that is processed in the following steps below. In the following the term phase sinogram $p_{d\phi}$ therefore either includes either a sinogram with entries for a single energy or with entries according to 2 or more energies.

At step S315, a spectral decomposition scheme is applied to the attenuation sinogram data (of step 310a,b) that represents the overall attenuation contribution to so decompose said contribution into a Compton scatter contribution and a photoelectric contribution as per equation (3). Because the acquisition at step S305 yielded 2 overall attenuation sinograms (one for each energy E1.E2), one can now solve equation (3) for the Compton contribution. The photoelectric contribution is no longer considered herein and may be discarded, but it is the Compton scatter contribution that is retained and consolidated into a (single) "Compton sinogram" $p_C$ that encodes at each entry the respective projection (that is, the line integral along the respective ray) of the attenuation caused by essentially only Compton scatter. In other words, the output supplied at step S315 is a Compton sinogram $p_C$. The decomposition allows increasing accuracy of the following computations, because the previously mentioned proportionality between the electron density and the linear attenuation applies strictly only to that part of the attenuation that is caused solely by Compton scatter.

At steps S320a,b, the respective energy dependent differential phase sinogram $p_{d\phi}$ is rescaled, to obtain the respective projections of the electron density. A similar rescaling is applied at step S325 to the entries of the Compton sinogram $p_C$. The so rescaled Compton sinogram $p_C$ now likewise represent the projection of the electron density but is now derived from a different data set, namely the Compton sinogram $p_C$. The rescaled sinograms $p_{d\phi}$, $p_C$ will be referred to hereinafter by the same symbols $p_C$, $p_{d\phi}$, as used previously for the sinograms pre-scale. Rescaling can be achieved in a known manner by a calibration procedure using a scan of a phantom with known electron density (e.g. water).

At step S330 the respective Compton sinograms $p_C$ and phase shift sinograms $p_{d\phi}$, are then received at image processor IP's input port IN. The input port IN may be a multichannel (one channel for each energy level and/or one channel for $p_C$ and $p_{d\phi}$, respectively) one or the input port IN may be arranged as a single channel input port through which all sinograms are received. It is envisaged herein, that the previous steps S310-S325 are executed by a preprocessor for instance in the DAS or are executed by a preprocessor integrated in the image processor IP. Also the step pairs S310a,b and/or steps S320a,b,S325 may be executed in a parallel pipeline or may be executed instead in a serial pipeline.

At step S335, the electron density image is then jointly reconstructed by using the sinograms as will now be explained in more detail.

In a preferred embodiment it is envisaged herein that the reconstruction is based on an iterative reconstruction scheme. Broadly, in iterative image reconstruction, the image of interest (which is an object in image space/domain) is not directly reconstructed as in the classical (filtered-) back projection (FBP) algorithm in which a sinogram (which is an object of the projection space/domain) is directly transformed into the respective image elements in the image domain, but instead the algorithm loops in a number of iterations between the image and projection domain. More specifically, in the present context, the iterative algorithm starts out with a current estimate for the electron density image. This estimated electron density image is then forward projected by a numerical implementation of a forward projector that takes the estimated electron density image from the image domain into the projection domain to so obtain "synthesized" or estimated sinograms of the currently estimated electron density image. In each iteration step, the estimated sinogram is then compared with the actually measured sinograms $p_C$, $p_{d\varphi}$ and a deviation (for instance, by taking the pixel-wise differences) between the estimated sinogram and the actually measured sinograms $p_C$, $p_{d\varphi}$ is then evaluated by a cost function C. The cost function assigns a "cost", (that is, a real number) to the current deviation. The objective then is to find estimates for the electron density x that minimize the cost. An update function is chosen which in one embodiment is given by an iteration scheme that iteratively outputs a sequence of estimates that is known to converge to a minimizer of the cost function. In one embodiment a maxim-likelihood (ML) approach is used and the cost function can be expressed as the negative logarithm of the likelihood function. The requirement for a minimal cost then corresponds to find a minimizer of the negative log-likelihood. A numerical algorithm is applied to solve for said minimizer which in turn yields the update function. An estimate is then accepted as the final estimate for the electron density if it returns an update that improves the cost less than a preset cost threshold or if a maximum number of iterations is reached. The initial estimate for the electron density image may be a very simple one such as an empty image or one that roughly encodes the expected structure to be imaged.

Looked at from a probabilistic/statistical point of view, the sinograms can be thought of as samples of random events subject to (white) noise each event being the detection (entry in the measured sinograms) at a respective detector pixel. If the underlying probability distribution is assumed Gaussian (or Poison for the photon counting embodiment), each detector pixel can then be associated with a Gaussian parameter ($\mu_G, \sigma^2$) for mean and variance of said local distribution. In ML, the Likelihood function L(x|b) can then be set up that relates to the likelihood to "explain" the event b (that is, the sinogram samples $p_C$ and $p_{d\varphi}$) given a certain (but yet unknown) image x (that is, a spatial distribution of the electron density which in turn is related, in the image domain, to the Compton part of $\mu(x,y,z)$ and to the real part of n(x,y,z), respectively). In the maximum likelihood (ML) approach, the question may then be asked which electron density x would maximize the likelihood function. Assuming a Gaussian distribution for the measurement and taking the logarithm of L then yields a "data term" which can be combined with a regularization term to arrive at a cost function for the iterative reconstruction with the following structure:

$$C=\|W^{-1}(Ax-b)\|^2+\beta R(x) \quad (x)$$

with the squared expression representing the data term and $\beta R(.)$ representing the regularization term.

More particularly, cost function C includes following elements, wherein:
A is the system matrix, i.e., A is a discretized form of the forward projection operator;
x is the unknown image to be reconstructed;
b is the measured data, that is, the collection of the two sinograms ($p_C$, $p_{d\varphi}$);
W is the square root of the covariance matrix of the measured data (which is well defined since the covariance matrix is positive definite), which quantifies the noise in the projection domain;
$\|.\|$ is a suitable norm (such as Euclidean distance) to quantify the mismatch of an image x with the actual measured data b,
R(.) is a roughness penalty (such as the Huber penalty applied to local differences of current the electron density to quantify the roughness or noise content in an image x) to enforce a certain smoothness of the estimate for the electron density image x;
$\beta$ is a regularization parameter, to enforce a certain "shape" for the estimate of the electron density. In general beta is a positive number that allows "fine tuning" the response of the penalty term R. For instance, choosing a large beta is to emphasize the roughness penalty response whereas choosing a small 13 is to mitigate the penalty response.

As mentioned earlier, the algorithm as proposed herein uses the fact that projections of image x, i.e., projections of spatial distribution of the electron density, is linearly related to the differential phase contrast signal $b_p=p_{d\varphi}$, but also to the Compton sinogram $p_C=b_C$ (after spectral decomposition). It is therefore proposed herein, that the above cost function C takes into account both signal channels at once or concurrently by defining $$A = \begin{pmatrix} A_C \\ A_p \end{pmatrix}, b = \begin{pmatrix} b_C \\ b_p \end{pmatrix}, W = \begin{pmatrix} W_C & 0 \\ 0 & W_p \end{pmatrix}$$

i.e., the system matrix A has a component for the Compton channel, which is a conventional discrete implementation of line integrals, and it has a further component for the differential phase contrast channel, which is a discrete implementation of the differential phase line integral. In other words, as proposed herein, the actually measured sinogram data b that is feed into the cost function C for evaluation includes both, the Compton line integrals as well as the differential phase contrast line integrals. In yet other words, Compton scatter caused attenuation data of the incident wave XB together with the incurred phase change are both evaluated by the very same cost function in each iteration step. The iterative reconstruction proceeds "jointly" in the sense that, in each iteration, estimates of both sinograms ($b_C$ and $b_p$) are generated and compared with the measured data b and that the cost for image x is then derived from a "misfit" in both sinograms.

According to one embodiment the discrete implementation of the differential phase line integral component $A_p$ of forward projection operator A is as described for instance by T Köhler et al in "Iterative Reconstruction for Differential Phase Contrast Imaging using spherically symmetric basis functions", Med Phys 38(8), 2011, pp 4542, with the understanding that other implementations are likewise envisaged herein. Each entry $a_{ij}$ component of the system matrix A is a discretized implementation of the forward projection operator that quantifies which effect the image element j has on the measured pixel with index i. For this projection operation, the-to-be-projected image x is thought to be made up from image elements. More particularly, the image is represented as a linear combination of a family of basis functions such as the common prism shaped "voxels". The respective sinograms are then "explained" as a linear combination of projections ("footprints") of those basis functions in the projection domain. According to one embodiment the basis functions as used herein for the implementation of the system matrix component $A_p$ is formed not from voxels but from a family of Kaiser-Bessel functions (a special variant of the Bessel functions also known as "blobs"). As observed in the early recited paper by Köhler et al, using blobs as basis functions to implement at least the $A_p$ part of the system matrix A allows securing a number of computational advantages. For instance, the projection operator in respect of the differential data as captured in the sinogram data $b_p$ involves a partial differentiation with respect to the distance coordinate of a polar coordinate parameterization of the respective sinogram data points. Using blobs as basis functions in the forward projection step of the iterative reconstruction, allows avoiding a numerical implementation of said differentiation operation which causes ill-conditioned behavior, that is, the numerical implementation is highly sensitive in respect of discretization errors. The blob based implementation to discretize the forward operator can also be applied when projecting onto the Compton component.

It is understood herein that that the cost function C as per expression (4) is written in matrix form for the sake of brevity. For instance the terms b, x although commonly represented as matrices, are considered as "vectors" herein, with each entry being multidimensional to achieve a particularly concise notation as per (4). Applying matrix multiplication, the cost function can be expanded into sum of terms including terms that represent the respective deviation or mismatch contribution between i) the forward projection of an image x and the measured phase contrast sinograms (if the phase contrast sinogram is spectral, there are respective deviation contribution terms for each of the two or more energy values E1,E2) and ii) the forward projection of image x and the measured Compton sinogram. Consolidating all mismatch contributions into a single function C, allows driving or guiding the iterations so as to arrive at an estimate for the density image whose projections approximate both of the respective sinogram estimates for $p_C$, $p_{d\phi}$.

As can be seen in expression (4) the cost function C penalizes (that is, incurs a higher cost) large deviations (that are weighted for prevalent noise as explained in more detail below) between the actually measured sinograms b and the estimated sinograms Ax as synthesized by application of the system matrix A to an image x. In addition to this deviation, the noise behavior at the detector is likewise considered in the cost function and is encapsulated in the matrix expression W'. The noise matrix in the noise term weights the deviations between the actually measured sinograms b and the estimated sinograms Ax to thereby better bring the cost function's return into line with characteristics of the particular detector used for measuring the data b. The noise is made up from detector quantum noise and jitter caused by the phase stepping. As briefly mentioned above in relation to ML, it has been found that noise may be assumed white and in particular Gaussian white. Looked at from a probabilistic point of view, the sinograms can be thought of as samples of random events each event being the detection (entry in the measured sinograms) at a respective detector cell. Each detector cell can then be associated with the Gaussian parameters $(\mu, \sigma^2)$ for mean and variance.

In other words and in the general case, matrix $W^{-1}$ (W=square root of the covariance matrix $\Sigma$) represents the noise in each detector pixel and the noise correlation between the detector pixels and the cost function C is configured to return a high cost for large deviations $\|Ax-b\|$ weighted by entries (variances and in the more general case covariances of the measurements) of the noise matrix $W^{-1}$. This allows better modeling the expected noise behavior at detector level and to incorporate said knowledge in the projection domain rather than in the image domain. The diagonal elements of $W^{-1}$ are based on estimates for the Gaussian variances $\sigma^s$ as mentioned above. The entries of $$W^{-1} = 2\sqrt{\begin{pmatrix} \Sigma_C & 0 \\ 0 & \Sigma_p \end{pmatrix}^{-1}}$$

are split up into a Compton component and a differential phase component, where $\Sigma_C$ is diagonal matrix including the Compton variances and $\Sigma_p$ is diagonal matrix including the differential phase variances.

The variance estimates for the Compton component can be estimated from the measured Compton sinogram by the Gaussian error propagation approach as described for instance in equations 6a-c on page 205 by D N Gauntt et al in "X-ray tube potential, filtration and detector considerations in dual energy chest radiography", Med Phys 21(2), February 1994.

For the differential phase sinogram data component, the variances can be estimated from the phase contrast sinogram by $2/[(\text{mean intensity(sinogram entry for pixel x,y)})*n*V^2]$ as defined in equations (26), (29—matrix entry at row 2, column 2) by Weber et al in "Noise in x-ray grating-based phase-contrast imaging", Medical Physics, Vol. 38, No. 7, July 2011. V is the visibility and n is the Talbot order, with n=1, 3, or 5 or 7. n=9 is also envisaged in some embodiments.

In one embodiment, the covariance matrix neglects any possible covariance between the Compton channel and the differential phase channels. Matrix $W^{-1}$ is then a diagonal matrix with each diagonal entry being the respective estimated variance $\sigma_i$ for the respective detector pixel/signal channel. This is a valid to a good approximation, but the proposed method can be likewise implemented with a covariance matrix having at least one non-diagonal non-zero element, or more specifically, can be implemented with a full covariance matrix also. This may allow modeling instances where there are known asymmetries or correlations in noise behavior such as predominant cross talk or afterglow effects in certain pixel regions of the detector D etc. One rationale for assuming the covariance matrix of diagonal form is that the phase retrieval processing as per steps S310a,b is applied to the original detector raw data in a per-pixel fashion so the noise in different pixels can be assumed to be uncorrelated in good approximation. Therefore, covariance matrix $\Sigma$ will typically have—even in the more complicated case—a rather simple structure $$\Sigma = \begin{pmatrix} \Sigma_C & \Sigma_{Cp} \\ \Sigma_{Cp} & \Sigma_p \end{pmatrix}$$

with all three sub-matrices $\Sigma$ being diagonal.

The cost function defined by these definitions for A, b, and W is essentially a function of the unknown x and can be minimized by standard techniques like the non-linear conjugated gradient method. In this embodiment, the update function for x is furnished by the standard conjugated gradient method, where x is updated in the "conjugate direction". In one embodiment, the conjugate direction is as defined by the Fletcher-Reeves formula although other variants for the step-size are also envisaged.

In an alternative embodiment, the update function for updating the electron density image estimate x in each iteration is based on an SPS (separable paraboloidal surrogates) scheme as in the above cited paper by T Köhler et al. Searching for the minimum of the likelihood function (or log-likelihood function) C is done for instance by a Newton type algorithm such as the classical Newton-Raphson method. In SPS, a "paraboloidal surrogate" is a quadratic function that is tangent from above to the negative log-likelihood. Convexity considerations yield a separable quadratic function that lies above the cost function. Minimization of the separable surrogate function is more tractable than that of the log-likelihood function and monotonicity of convergence to the minimizer of the log-likelihood is ensured. However this is but one embodiment, and other numerical methods and/or cost functions structures are likewise envisaged herein. In particular, the iterative reconstruction has been expressed above in terms of minimization of a cost function but again, this is an exemplary embodiment. On occasion, some iterative reconstruction schemes may require a different optimization, for instance to maximize for an objective function and such schemes are likewise envisaged herein not least for the reason that any maximization problem can normally be expressed in terms of a minimization problem after algebraic rearrangements.

In either embodiment, the iterations are aborted after the fixed number of iterations (which in one embodiment are user adjustable) or are aborted if the cost function barely changes any more during iteration, e.g., if the cost decrease due to the update is less than a user definable threshold $\epsilon$.

In short, the proposed method affords:

the individual noise levels of all data is taken into account correctly and are specified at detector pixel level, that is, in projection domain;

missing data (for reasons of phase wrapping, loss of coherence, etc.) in the phase shift sinogram can be neglected since iterative reconstruction is known to be rather robust with respect to this and because the other channel, that is the Compton scatter sinogram may still include enough projective information to offset for the missing data in the differential phase sinogram;

that, in distinction to other approaches such as the one described in WO 2013/027138, no parameterization of SNR (signal-to-noise-ratio) in image domain is required since the noise estimates on the measured data are taken instead (and the noise is known to be white in this domain).

The method described above and related image processor may be applied to all differential phase contrast CT imaging systems, preferably to imaging systems with spectrally resolving detectors such as energy-selective or photon counting detectors or others.

At an optional step (not shown in FIG. 3), the electron density cross section image or a volume formed from a plurality of electron density cross sections is then rendered and displayed on monitor M.

In order to effect the various modes of the visualizations, image processor IP as proposed herein includes visualization module VS that drives the systems video card to effect display of the computed electron density image on monitor M.

The image processor IP and its components may be arranged as separate modules arranged in a distributed architecture and connected in a suitable communication network.

In one embodiment, image processer IP is arranged as dedicated FPGAs or as hardwired standalone chips.

In an alternate embodiment, image processer IP and its components are resident in work station CON running as software routines thereon. Image processer IP and its components may be programmed in a suitable scientific computing platform such as Matlab® and may be translated into C++ or C routines maintained in a library and linked when called on by work station CON's operating system.

Although in the above, a grating based setup has been described to extract the phase shift contribution from the measured projection data, other PCI (phase contrast imaging) principles may likewise be used, such as analyzer-based imaging or Propagation-based imaging.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for generating an image of an electron density in an object or in a part thereof, comprising the following steps of:
   receiving:
   i) for at least one energy value, a phase-contrast sinogram, $p_{d\phi}$, derived from data detected by a radiation sensitive detector of a scanner, with $p_{d\phi}$ relating to phase shift gradients of phase shifts experienced by radiation after the radiation's passage through the object; and
   ii) a Compton attenuation sinogram, $p_c$, derived from the data detected by the radiation sensitive detector or from data detected by a different radiation sensitive detector, with $p_c$ recording essentially the Compton scatter contribution to an overall attenuation experienced by the radiation in said passage through the object; and
   based on both of the two sinograms $p_{d\phi}$ and $p_c$, jointly reconstructing a cross sectional image of the electron density.

2. The method of claim 1, wherein the joint reconstruction proceeds iteratively.

3. The method of claim 2, wherein iterations in the joint reconstruction are driven by a cost function including a noise term that models noise as recorded in the sinograms.

4. The method of claim 3, wherein the noise term is a covariance matrix.

5. The method of claim 4, wherein the covariance matrix has diagonal form.

6. The method of claim 4, wherein the covariance matrix has at least one non-zero off diagonal element.

7. The method of claim 3, wherein the cost function is derived from a log-likelihood function that includes the two sinograms.

8. The method of claim 1, wherein the reconstruction step is based on a conjugate gradient method.

9. The method of claim 1, wherein the reconstruction step is based on a Newton-Raphson method.

10. The method of claim 1, wherein the scanner for acquiring the $p_C$ and/or $p_{d\phi}$ sinogram is a multi-energy scanner, in particular a dual energy scanner, or wherein the scanner has a multi layer detector, in particular a dual layer detector, or wherein the scanner is a spectral imaging scanner having a photon counting detector.

11. The method of claim 1, wherein the scanner includes differential phase contrast imaging equipment for the acquisition of the phase-contrast sinogram $p_{d\phi}$.

12. An image processing system including:
   one or more scanners configured that generate a phase-contrast sinogram, $p_{d\phi}$ and a Compton attenuation sinogram, $p_c$ of an object;
   a processor that reconstructs an image of an electron density in the object with the phase-contrast sinogram and the Compton attenuation sinogram, $p_c$;
   a display for displaying the electron density image as reconstructed by the processor.

13. The image processing system of claim 12, wherein the processor iteratively reconstructs the image based on both the phase-contrast sinogram and the Compton attenuation sinogram.

14. The image processing system of claim 13, wherein the iterative reconstruction algorithm is driven by a cost function.

15. The image processing system of claim 13, wherein the cost function is derived from a log-likelihood function that includes the two sinograms.

16. A non-transitory computer readable medium having stored thereon a computer executable program which when executed by a processor causes the processor to:
   receive, for at least one energy value, a phase-contrast sinogram;
   receive a Compton attenuation sinogram; and
   reconstruct a cross sectional image of an electron density based on the phase-contrast sinogram and the Compton attenuation sinogram.

17. The non-transitory computer readable medium of claim 16, further comprising:
   deriving the phase-contrast sinogram from data detected by a radiation sensitive detector of a scanner, where the phase-contrast sinogram corresponds to phase shift gradients of phase shifts experienced by radiation after radiation passes through an object.

18. The non-transitory computer readable medium of claim 17, further comprising:
   deriving the Compton attenuation sinogram from data detected by the radiation sensitive detector of the scanner, wherein the Compton attenuation sinogram corresponds to a Compton scatter contribution to an overall attenuation experienced by the radiation passing through the object.

19. The non-transitory computer readable medium of claim 17, further comprising:
   deriving the Compton attenuation sinogram from data detected by a different radiation sensitive detector, wherein the Compton attenuation sinogram corresponds to a Compton scatter contribution to an overall attenuation experienced by the radiation passing through the object.

20. The non-transitory computer readable medium of claim 17, wherein the computer executable program further causes the processor to:
   jointly reconstruct the cross sectional image.

* * * * *